(12) United States Patent
Huang et al.

(10) Patent No.: US 11,998,909 B2
(45) Date of Patent: Jun. 4, 2024

(54) METHOD FOR CONTINUOUSLY COLLECTING FLUORESCENCE DATA OF MICROFLUIDIC CHIP

(71) Applicant: CAPITALBIO TECHNOLOGY (CHENGDU) CO., LTD., Sichuan (CN)

(72) Inventors: Yong Huang, Sichuan (CN); Guanbin Zhang, Sichuan (CN); Chicheng Song, Sichuan (CN); Yong Tao, Sichuan (CN); Ruoran Li, Sichuan (CN); Hongcheng Zhou, Sichuan (CN)

(73) Assignee: CAPITALBIO TECHNOLOGY (CHENGDU) CO., LTD., Chengdu (CN)

( * ) Notice: Subject to any disclaimer, the term of this patent is extended or adjusted under 35 U.S.C. 154(b) by 410 days.

(21) Appl. No.: 16/949,345

(22) Filed: Oct. 26, 2020

(65) Prior Publication Data

US 2021/0276011 A1    Sep. 9, 2021

(30) Foreign Application Priority Data

Mar. 6, 2020  (CN) .......................... 202010150335.7

(51) Int. Cl.
*B01L 3/00*     (2006.01)
*G01N 15/14*    (2006.01)

(52) U.S. Cl.
CPC .... *B01L 3/502715* (2013.01); *G01N 15/1484* (2013.01); *G01N 2015/1402* (2013.01)

(58) Field of Classification Search
CPC .......... B01L 3/502715; G01N 15/1484; G01N 2015/1402
See application file for complete search history.

(56) References Cited

U.S. PATENT DOCUMENTS 6,043,880 A * 3/2000 Andrews ................ G01N 21/64
                                            250/361 C
6,100,535 A   8/2000 Mathies et al.
(Continued)

FOREIGN PATENT DOCUMENTS

CN    101201323 A    6/2008
CN    101620187 A    1/2010
(Continued)

OTHER PUBLICATIONS

Chinese Office Action dated Jun. 6, 2022, in priority Chinese Application No. 202010150335.7.

*Primary Examiner* — Matthew D Krcha
*Assistant Examiner* — Tingchen Shi
(74) *Attorney, Agent, or Firm* — MASCHOFF BRENNAN

(57) ABSTRACT

A method for continuously collecting fluorescence data of a microfluidic chip is provided. In the method, an optical path system emits a light perpendicular to the microfluidic chip, such that a center of a light spot formed by the optical path system on the microfluidic chip is located on a circle formed by centers of all reaction cells. The microfluidic chip is rotated around a center of the circle formed by centers of all the reaction cells. Fluorescence signal values are collected by using the optical path system along a rotation direction of the microfluidic chip. The collected fluorescence signal values are processed to obtain effective fluorescence data of all the reaction cells.

15 Claims, 3 Drawing Sheets

(56) References Cited

U.S. PATENT DOCUMENTS

| | | | | |
|---|---|---|---|---|
| 2005/0046849 A1* | 3/2005 | Cromwell | ............ | G02B 21/0076 356/417 |
| 2005/0078860 A1* | 4/2005 | Minor | .................. | C12Q 1/6837 382/129 |
| 2005/0219527 A1* | 10/2005 | Ikeuchi | .............. | G01N 15/1459 356/339 |
| 2005/0264805 A1* | 12/2005 | Cromwell | ............ | G01N 35/028 356/246 |
| 2017/0074776 A1* | 3/2017 | Fox | .................... | G01N 15/1429 |
| 2017/0292907 A1* | 10/2017 | Sahlgren | ................ | G02B 21/36 |
| 2019/0212264 A1 | 7/2019 | Su et al. | | |

FOREIGN PATENT DOCUMENTS

| | | |
|---|---|---|
| CN | 103901189 A | 7/2014 |
| CN | 104630373 A | 5/2015 |
| CN | 105300943 A | 2/2016 |
| CN | 106085842 A | 11/2016 |
| CN | 106442443 A | 2/2017 |
| CN | 109897781 A | 6/2019 |
| CN | 110470609 A | 11/2019 |
| WO | 9939193 A1 | 8/1999 |

\* cited by examiner

METHOD FOR CONTINUOUSLY COLLECTING FLUORESCENCE DATA OF MICROFLUIDIC CHIP

This application claims the priority to Chinese Patent Application No. 202010150335.7, titled "METHOD FOR CONTINUOUSLY COLLECTING FLUORESCENCE DATA OF MICROFLUIDIC CHIP", filed on Mar. 6, 2020 with the Chinese Patent Office, which is incorporated herein by reference in its entirety.

TECHNICAL FIELD

The present disclosure relates to the technical field of microfluidic chip data collection, and in particular to a method for continuously collecting fluorescence data of a microfluidic chip.

BACKGROUND

Nucleic acid analysis is widely used in various fields, such as life sciences, medicine, food safety, and environmental monitoring. A microfluidic chip detection technology is adopted in the nucleic acid analysis, by which discontinuous processes, such as sample preparation, biochemical reaction, analysis and detection, are integrated into a microfluidic chip, realizing miniaturization, automation, integration and portability of the processes from sample reaction to result obtaining. How to correctly and effectively collect fluorescence signal data in a nucleic acid amplification process is important for the nucleic acid analysis.

The method for detecting nucleic acid amplification on a microfluidic chip according to the conventional technology is a single-point collection method. In the method according to the conventional technology, a motor drives the microfluidic chip to rotate, and stops the microfluidic chip stops when a reaction cell of the microfluidic chip reaches a specified position. Then, an optical path system detects a fluorescence signal value of the reaction cell, and an MCU (Microcontroller Unit) performs an average operation on hundreds of detected fluorescence signal values to obtain a final fluorescence signal value of the reaction cell. The method according to the conventional technology requires a high precision of the rotation angle of the motor, resulting in low reliability and poor practicability. In practices, there may be a deviation between a detection position and the position of the reaction cell (as shown in FIG. 1) due to the error of the motor, so that the fluorescence signal value cannot be collected accurately. In addition, the method according to the conventional technology cannot meet the requirements of both high-speed centrifuging and low-speed detection. Furthermore, the fluorescent signal value of the reaction cell and changes of the fluorescent signal value cannot be truly reflected because the fluorescent signal value of the reaction cell is always detected at the specified position.

SUMMARY

According to the present disclosure, a method for continuously collecting fluorescence data of a microfluidic chip is provided to solve the above problems.

The following technical solutions are provided according to the present disclosure.

A method for continuously collecting fluorescence data of a microfluidic chip includes:

emitting, by an optical path system, a light perpendicular to the microfluidic chip, such that a center of a light spot formed by the light on the microfluidic chip is located on a circle formed by centers of all reaction cells;

rotating the microfluidic chip around a center of the circle formed by centers of all the reaction cells, and collecting fluorescence signal values along a rotation direction of the microfluidic chip by using the optical path system; and processing the collected fluorescence signal values to obtain effective fluorescence data of all the reaction cells.

In an embodiment, the microfluidic chip is rotated in a clockwise direction or a counterclockwise direction.

In an embodiment, the microfluidic chip is rotated by one circle to collect fluorescence signal values of all the reaction cells for each time.

In an embodiment, the processing the collected fluorescence signal values to obtain effective fluorescence data of all the reaction cells includes:

step (1), determining a maximum value A among fluorescence signal values of one of the reaction cells;

step (2), calculating B according to $B=A*S$, where S represents a preset coefficient, and $0<S<1$;

step (3), counting the number N of fluorescence signal values greater than B among the fluorescence data of the reaction cell;

step (4), determining A as the effective fluorescence data of the reaction cell if N is greater than or equal to P, where P represents a preset threshold, where the step (1) to (4) are performed for each of the reaction cells to obtain effective fluorescence data of each of the reaction cells.

In an embodiment, if N is less than P, the steps (1) to (4) are repeated by using a sub-maximum value An among the fluorescence signal values of the reaction cell as A, until N is greater than or equal to P, and the finally used sub-maximum value An is determined as the effective fluorescence data.

In an embodiment, fluorescence signal values of the microfluidic chip are continuously collected, and effective fluorescence data is continuously obtained based on the continuously collected fluorescence signal values. Effective fluorescence data of a reaction cell obtained based on fluorescence signal values collected at a previous time and effective fluorescence data of the reaction cell obtained based on fluorescence signal values collected at a current time are compared. If the effective fluorescence data at the current time is in a range of $\pm C$ % of the effective fluorescence data at the previous time, it is determined that the effective fluorescence data at the current time is normal. If the effective fluorescence data at the current time is not in the range of $\pm C$ % of the effective fluorescence data at the previous time, it is determined that the effective fluorescence data at the current time is abnormal.

In an embodiment, if the effective fluorescence data at the current time t is abnormal, the fluorescence signal values of the microfluidic chip are continuously collected for another three consecutive times t+1, t+2, and t+3. If effective fluorescence data of the reaction cell at the time t+2 is in a range of $\pm C$ % of effective fluorescence data of the reaction cell at the time t+1 and effective fluorescence data of the reaction cell at the time t+3 is in a range of $\pm C$ % of the effective fluorescence data of the reaction cell at the time t+2, it is determined that the effective fluorescence data of the reaction cell at the three times is normal.

In an embodiment, if the effective fluorescence data is determined to be abnormal for more than D times, an alarm is triggered, where D represents a preset value.

In an embodiment, the microfluidic chip is driven by a motor to rotate.

In an embodiment, a rotation speed of the motor is detected in real time while collecting the fluorescence signal values, and an alarm is triggered if it is detected that the rotation speed of the motor is abnormal.

In summary, with the above technical solutions according to the present disclosure, the following beneficial effects can be achieved.

Firstly, according to the present disclosure, the microfluidic chip is rotated to perform the collection continuously, avoiding the problem of inaccurate measurement results due to mechanical position errors in the single-point collection method.

Secondly, with the technical solution according to the present disclosure, the problem of inaccurate measurement results caused by a cavity formed due to temperature changes in the amplification of reagents can be avoided.

Thirdly, with the technical solution according to the present disclosure, the blending effect of reagents and the edge effect in reaction cells can be evaluated.

Fourthly, with the technical solution according to the present disclosure, an amplification curve can be obtained by sorting the obtained effective fluorescence data chronologically.

BRIEF DESCRIPTION OF THE DRAWINGS

The drawings to be used in the description of the embodiments are described briefly as follows, to describe the technical solutions according to the embodiments of the present disclosure clearer. It should be understood that the drawings in the following description only illustrate some embodiments of the present disclosure and therefore are not intended to limit the present disclosure. For those skilled in the art, other drawings may be obtained according to these drawings without any creative work.

DETAILED DESCRIPTION OF THE EMBODIMENTS

Figure 1:
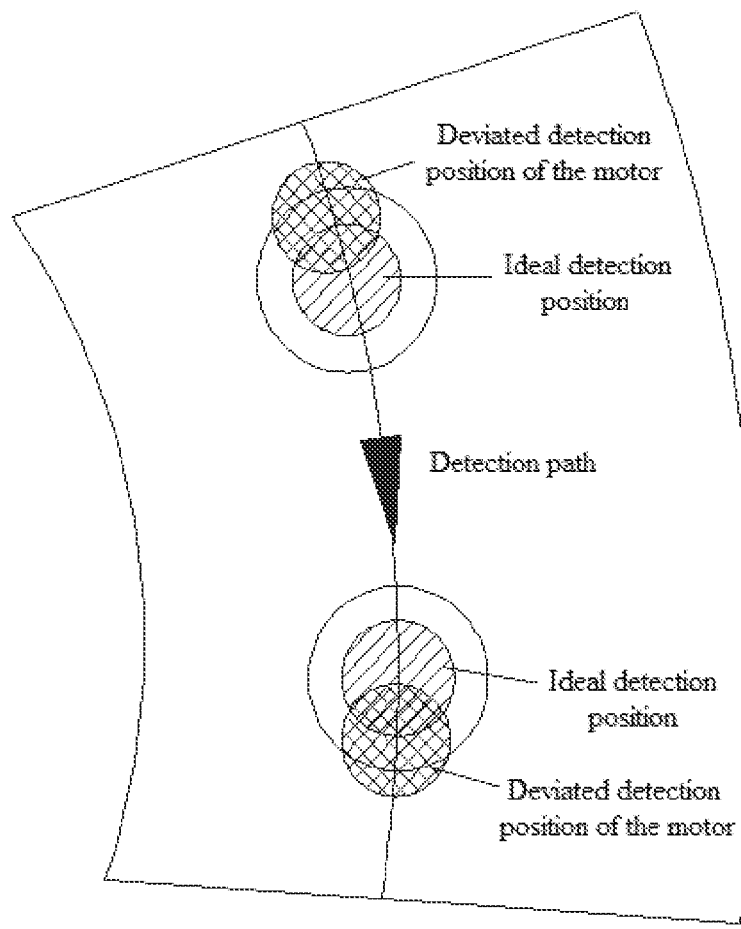
FIG. 1 is a schematic diagram of a single-point collection method according to the conventional technology.

In order that the objectives, technical solutions and advantages of the present disclosure can be clearer, the present disclosure is described in detail as follows in conjunction with the drawings and embodiments. It should be understood that the described embodiments are only used to explain the present disclosure and not to limit the present disclosure, that is, the described embodiments are only a few rather than all of the embodiments according to the present disclosure. The components included in the embodiments according to the present disclosure and described and shown in the drawings generally can be arranged and designed in various configurations. Therefore, the following detailed description of the embodiments according to the present disclosure shown in the accompanying drawings is not intended to limit the scope of the present disclosure, but merely to illustrate selected embodiments of the present disclosure. Based on the embodiments according to the present disclosure, any other embodiments obtained by those skilled in the art without any creative work fall into the scope of the present disclosure.

According to the conventional technology, a single-point collection method is provided. In the single-point collection method, a motor drives the microfluidic chip to rotate, and stops the microfluidic chip when a reaction cell of the microfluidic chip reaches a specified position. Then, an optical path system detects a fluorescence signal value of the reaction cell, and an MCU performs an average operation on hundreds of obtained fluorescence signal values to obtain a final fluorescence signal value of the reaction cell. With the method according to the conventional technology, a deviation between a detection position and the position of the reaction cell is easily caused by the mechanical error of the motor. In view of the above, a continuous collection method is provided according to the present disclosure. In the continuous collection method, the microfluidic chip rotates at a low speed and does not stop rotating when a reaction cell of the microfluidic chip reaches a specified position, thereby achieving continuous collection. The collected fluorescence signal values are processed to obtain effective fluorescence data of each of the reaction cells on the microfluidic chip.

Figure 2:
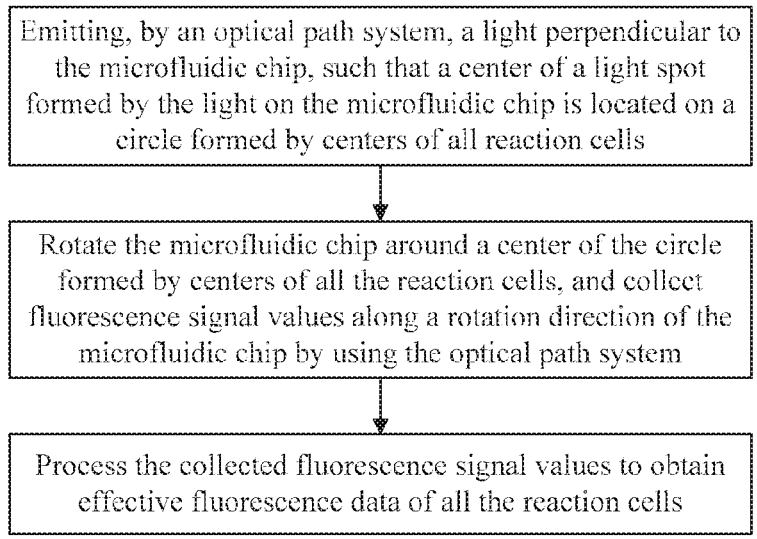
FIG. 2 is a flow chart of a method for continuously collecting fluorescence data of a microfluidic chip according to the present disclosure.

As shown in FIG. 2, a method for continuously collecting fluorescence data of a microfluidic chip is provided according to an embodiment of the present disclosure. The method includes the following operations.

Figure 3:
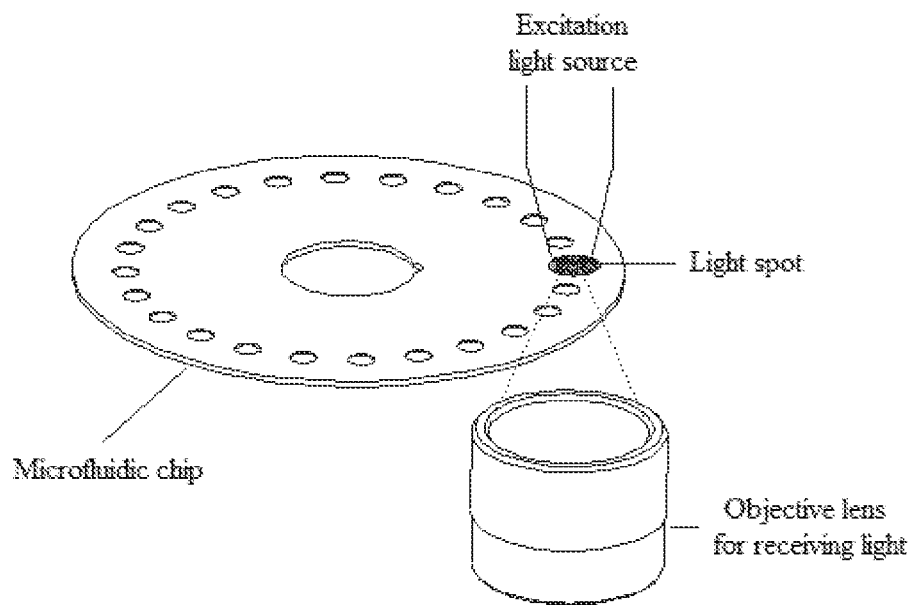
FIG. 3 is a schematic diagram showing a position relationship between an optical path system and a microfluidic chip in a method for continuously collecting fluorescence data of the microfluidic chip according to the present disclosure.

As shown in FIG. 3, an optical path system is arranged to emit a light perpendicular to the microfluidic chip, such that a center of a light spot formed by the light on the microfluidic chip is located on a circle formed by centers of all reaction cells. Generally, the optical path system includes an excitation light source used for emitting a light and an objective lens used for receiving the light.

Figure 4:
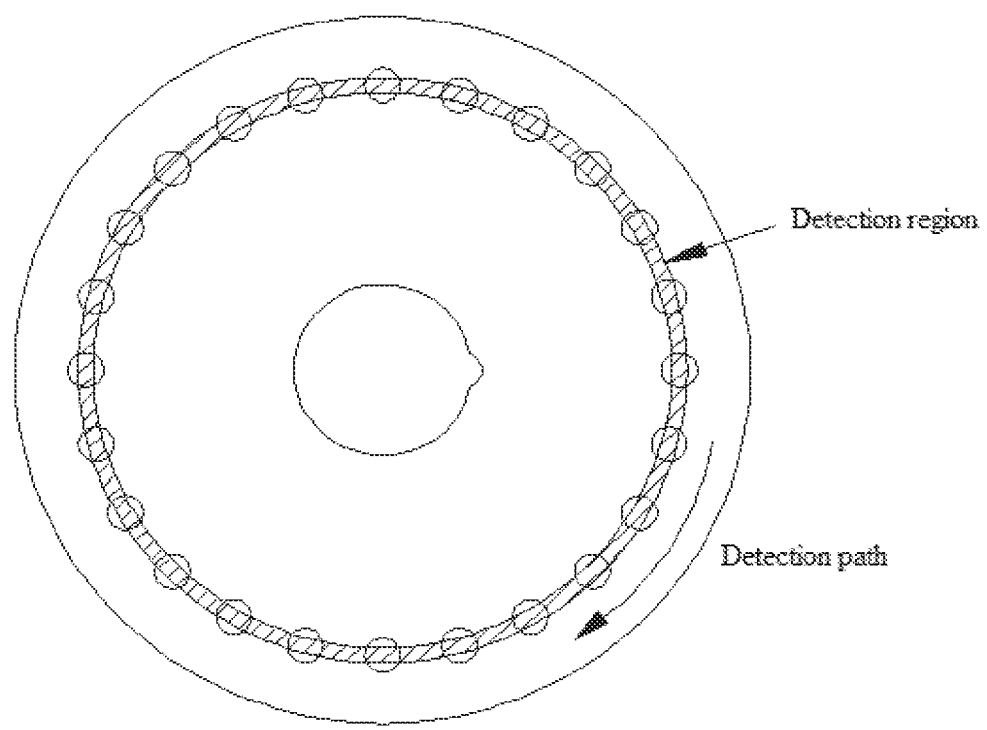
FIG. 4 is a schematic diagram showing a detection path in a method for continuously collecting fluorescence data of a microfluidic chip according to the present disclosure.

As shown in FIG. 4, the microfluidic chip is rotated around a center of the circle formed by centers of all the reaction cells, so that fluorescence signal values are collected by the optical path system along a rotation direction of the microfluidic chip. In some embodiments, the microfluidic chip may be rotated in a clockwise direction or a counterclockwise direction.

The collected fluorescence signal values are processed to obtain effective fluorescence data of each of the reaction cells.

To facilitate calculations, the microfluidic chip is rotated by one circle for collecting fluorescence signal values of all the reaction cells for each time. The method for processing the collected fluorescence signal values to obtain effective fluorescence data of each of the reaction cells includes the following steps (1) to (4).

In step (1), a maximum value A among fluorescence signal values of a reaction cell is determined.

In step (2), B is calculated according to B=A*S, where S represents a preset coefficient, and 0<S<1.

In step (3), the number N of fluorescence signal values greater than B among fluorescence signal values of the reaction cell is counted.

In step (4), A is determined as the effective fluorescence data of the reaction cell if N is greater than or equal to P, where P represents a preset threshold.

Steps (1) to (4) are performed for each of the reaction cells to obtain effective fluorescence data of each reaction cell.

In the above method for processing the collected fluorescence signal values to obtain the effective fluorescence data of the reaction cell, if N is less than P, a sub-maximum value An among the fluorescence signal values of the reaction cell may be determined to be used as A to perform steps (1) to (4), which is repeated until N is greater than or equal to P. Then the finally used sub-maximum value An is determined as the effective fluorescence data of the reaction cell.

In an embodiment, in order to prevent data abnormalities caused by an unknown factor, fluorescence signal values of the microfluidic chip are continuously collected, and effective fluorescence data is continuously obtained based on the continuously collected fluorescence signal values. For a same reaction cell, effective fluorescence data of the reaction cell collected at a previous time and effective fluorescence data of the reaction cell collected at a current time are compared. If the effective fluorescence data collected at the current time is in a range of ±C % of the effective fluorescence data collected at the previous time, it is determined that the effective fluorescence data collected at the current time is normal and can be used for further processing. If the effective fluorescence data collected at the current time is not in the range of ±C % of the effective fluorescence data collected at the previous time, it is determined that the effective fluorescence data collected at the current time is abnormal.

In an embodiment, if the effective fluorescence data collected at the current time (time t) is abnormal, the fluorescence signal values of the microfluidic chip may be continuously collected for another three consecutive times t+1, t+2, and t+3. If effective fluorescence data of the reaction cell collected at the time t+2 is in a range of ±C % of effective fluorescence data of the reaction cell collected at the time t+1 and effective fluorescence data of the reaction cell collected at the time t+3 is in a range of ±C % of the effective fluorescence data of the reaction cell collected at the time t+2, it is determined that the effective fluorescence data collected at the three times are normal.

In an embodiment, if the effective fluorescence data is determined to be abnormal for more than D times, an alarm is triggered, where D represents a preset value.

In addition, a rotation speed of the motor is detected in real time while collecting the fluorescence signal values. If an abnormal rotation speed of the motor is detected, an alarm is triggered.

An example is described below, in which a microfluidic chip has 24 (n=24) reaction cells, the speed of the motor is 15 s/round, and a fluorescence signal value is collected every 3 ms. In each round of data collection, the microfluidic chip is rotated by one circle in a clockwise direction, to collect totally 5016 (m=5000) fluorescence signal values.

Figure 5:
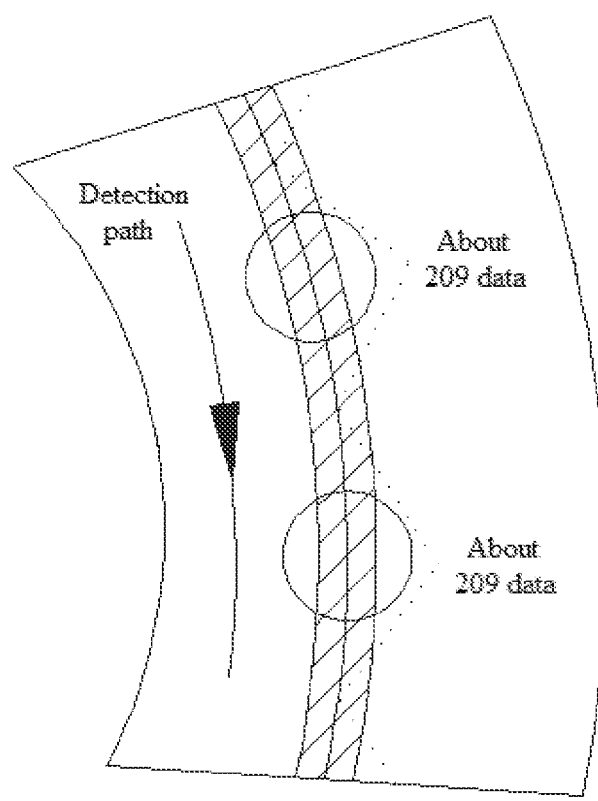
FIG. 5 is a schematic diagram of an example of a method for continuously collecting fluorescence data of a microfluidic chip according to the present disclosure.

In step (1), as shown in FIG. 5, the number of fluorescence signal values collected for each of the reaction cells is calculated according to the following equation:

$$l = m/n = 5000/24 = 208.$$

In step (2), a maximum value A among the fluorescence signal values of a reaction cell is determined.

In step (3), S is set to 0.9, and B is calculated according to B=A*S.

In step (4), the number of fluorescence signal values greater than B among the 1 fluorescence signal values of the reaction cell is counted as N.

In step (5), P is set to 30 or 50. If N is greater than or equal to P, A is determined as the effective fluorescence data of the reaction cell of this time. If N is less than P, a sub-maximum value An among the fluorescence signal values of the reaction cell is determined to be used as A to perform steps (2) to (5), which is repeated until N is greater than or equal to P, then the finally used sub-maximum value An is determined as the effective fluorescence data.

In step (6), steps (2) to (5) are performed for each of the reaction cells to obtain effective fluorescence data of the reaction cells.

In step (7), steps (2) to (6) are performed on the fluorescence signal values collected at different times to obtain effective fluorescence data at different times, and the effective fluorescence data at different times are sorted chronologically to form an amplification curve.

In step (8), first-order smoothing operation or higher-order smoothing operation is performed on the effective fluorescence data at different times of a same reaction cell.

The foregoing embodiments are only preferred embodiments of the present disclosure and are not intended to limit the present disclosure. All modifications, equivalent replacement and improvements made based on the spirit and principle of the present disclosure should fall in the scope of protection of the present disclosure.

The invention claimed is:

1. A method for continuously collecting fluorescence data of a microfluidic chip, comprising:
   emitting, by an optical path system, a light perpendicular to the microfluidic chip, wherein centers of all reaction cells forms a same circle, and a center of a light spot formed by the light on the microfluidic chip is always located on the circle formed by the centers of all reaction cells;
   rotating the microfluidic chip around a center of the circle formed by the centers of all the reaction cells, and collecting fluorescence signal values along a rotation direction of the microfluidic chip by using the optical path system; and
   processing the collected fluorescence signal values to obtain effective fluorescence data of all the reaction cells,
   wherein the microfluidic chip is rotated by one revolution to collect fluorescence signal values of all the reaction cells for each time,
   wherein the processing the collected fluorescence signal values to obtain effective fluorescence data of all the reaction cells comprises:
   step (1), determining a maximum value A among fluorescence signal values of one of the reaction cell;
   step (2), calculating B according to B=A*S, where S represents a preset coefficient, and 0<S<1;
   step (3), counting the number N of fluorescence signal values greater than B among the fluorescence signal values of the reaction cell;
   step (4), determining A as the effective fluorescence data of the reaction cell if N is greater than or equal to P, where P represents a preset threshold,
   wherein the steps (1) to (4) are performed for each of the reaction cells to obtain effective fluorescence data of each of the reaction cells.

2. The method for continuously collecting fluorescence data of a microfluidic chip according to claim 1, wherein the microfluidic chip is rotated in a clockwise direction or a counterclockwise direction.

3. The method for continuously collecting fluorescence data of a microfluidic chip according to claim 2, wherein the microfluidic chip is driven by a motor to rotate.

4. The method for continuously collecting fluorescence data of a microfluidic chip according to claim 1, further comprising:
repeating, if N is less than P, the steps (1) to (4) by using a sub-maximum value An among the fluorescence signal values of the reaction cell as A, until N is greater than or equal to P, and
determining the finally used sub-maximum value An as the effective fluorescence data of the reaction cell.

5. The method for continuously collecting fluorescence data of a microfluidic chip according to claim 4, wherein the microfluidic chip is driven by a motor to rotate.

6. The method for continuously collecting fluorescence data of a microfluidic chip according to claim 1, wherein the microfluidic chip is driven by a motor to rotate.

7. The method for continuously collecting fluorescence data of a microfluidic chip according to claim 1, wherein the microfluidic chip is driven by a motor to rotate.

8. The method for continuously collecting fluorescence data of a microfluidic chip according to claim 7, further comprising:
detecting, a rotation speed of the motor in real time while collecting the fluorescence signal values; and
triggering, an alarm if it is detected that the rotation speed of the motor is abnormal.

9. The method for continuously collecting fluorescence data of a microfluidic chip according to claim 1, further comprising:
collecting, fluorescence signal values of the microfluidic chip continuously, and obtaining continuously effective fluorescence data based on the collected fluorescence signal values;
comparing, effective fluorescence data of a reaction cell obtained based on fluorescence signal values collected at a previous time and effective fluorescence data of the reaction cell obtained based on fluorescence signal values collected at a current time;
determining, if the effective fluorescence data at the current time is in a range of ±C % of the effective fluorescence data at the previous time, that the effective fluorescence data at the current time is normal; and
determining, if the effective fluorescence data at the current time is not in the range of ±C % of the effective fluorescence data at the previous time, that the effective fluorescence data at the current time is abnormal.

10. The method for continuously collecting fluorescence data of a microfluidic chip according to claim 9, wherein the microfluidic chip is driven by a motor to rotate.

11. The method for continuously collecting fluorescence data of a microfluidic chip according to claim 9, further comprising:
continuously collecting, if the effective fluorescence data at the current time t is abnormal, the fluorescence signal values of the microfluidic chip for another three consecutive times t+1, t+2, and t+3, and
determining, if effective fluorescence data of the reaction cell at the time t+2 is in a range of ±C % of effective fluorescence data of the reaction cell at the time t+1 and effective fluorescence data of the reaction cell at the time t+3 is in a range of ±C % of the effective fluorescence data of the reaction cell at the time t+2, that the effective fluorescence data of the reaction cell at the three times is normal.

12. The method for continuously collecting fluorescence data of a microfluidic chip according to claim 11, further comprising:
trigging an alarm if the effective fluorescence data is determined to be abnormal for more than D times, where D represents a preset value.

13. The method for continuously collecting fluorescence data of a microfluidic chip according to claim 11, wherein the microfluidic chip is driven by a motor to rotate.

14. The method for continuously collecting fluorescence data of a microfluidic chip according to claim 9, further comprising:
trigging an alarm if the effective fluorescence data is determined to be abnormal for more than D times, where D represents a preset value.

15. The method for continuously collecting fluorescence data of a microfluidic chip according to claim 14, wherein the microfluidic chip is driven by a motor to rotate.

* * * * *